United States Patent
Steiner

(10) Patent No.: US 9,625,727 B2
(45) Date of Patent: Apr. 18, 2017

(54) DEVICE FOR HOMOGENIZING A LASER BEAM

(71) Applicant: LIMO Patentverwaltung GmbH & Co.KG, Dortmund (DE)

(72) Inventor: Ingo Steiner, Dortmund (DE)

(73) Assignee: LIMO PATENT VERWALTUNG GMBH & Co. KG., Dortmung (DE)

( * ) Notice: Subject to any disclaimer, the term of this patent is extended or adjusted under 35 U.S.C. 154(b) by 0 days.

(21) Appl. No.: 14/777,174

(22) PCT Filed: Mar. 7, 2014

(86) PCT No.: PCT/EP2014/054497
§ 371 (c)(1),
(2) Date: Sep. 15, 2015

(87) PCT Pub. No.: WO2014/146916
PCT Pub. Date: Sep. 25, 2014

(65) Prior Publication Data
US 2016/0033774 A1    Feb. 4, 2016

(30) Foreign Application Priority Data
Mar. 20, 2013   (DE) .................. 10 2013 102 863

(51) Int. Cl.
*G02B 27/09*   (2006.01)
*G02B 3/06*    (2006.01)

(52) U.S. Cl.
CPC .......... *G02B 27/0966* (2013.01); *G02B 3/06* (2013.01); *G02B 27/0927* (2013.01); *G02B 27/0961* (2013.01)

(58) Field of Classification Search
CPC ................................................ G02B 27/0966
(Continued)

(56) References Cited

U.S. PATENT DOCUMENTS 6,680,800 B1   1/2004 Schreiber et al.
2005/0063435 A1*  3/2005 Imai .................. G02B 27/0955
                                                          372/43.01
(Continued)

FOREIGN PATENT DOCUMENTS

DE    10 209 605            10/2002
DE    10 2007 026 730 A1   12/2007
DE    10 2007 020 789      11/2008

OTHER PUBLICATIONS

International Search Report for counterpart PCT Application (PCT/EP2014/05515), May 26, 2014 (16 pp.).
(Continued)

*Primary Examiner* — James Jones
(74) *Attorney, Agent, or Firm* — Cohen & Hildebrand, PLLC

(57) ABSTRACT

Device for homogenizing a laser beam including a first substrate with a first lens array including a plurality of cylindrical lenses and a second substrate with a second cylindrical lens array, which is arranged in the beam path downstream of the first substrate and includes a plurality of cylindrical lenses. Exactly one of the cylindrical lenses of the second lens array is assigned to each of the cylindrical lenses of the first lens array. Center-to-center distances between the cylindrical lenses of the first lens array are greater than the center-to-center distances between the cylindrical lenses of the second lens array. A lens vertex of a central one of the cylindrical lenses of the first lens array is aligned with a lens vertex of a central one of the cylindrical lenses of the first lens array that is assigned thereto. Lens vertices of the other cylindrical lenses of the second lens array and the lens vertices of the cylindrical lenses of the
(Continued)

first lens array that are assigned thereto have an outwardly increasing vertex offset proceeding from the center of the second lens array.

14 Claims, 3 Drawing Sheets

(58) Field of Classification Search
USPC .......................................................... 359/710
See application file for complete search history.

(56) References Cited

U.S. PATENT DOCUMENTS

2006/0159147 A1    7/2006   Grenier et al.
2006/0291509 A1   12/2006   Mitra et al.

OTHER PUBLICATIONS

German Search Report for counterpart German Application (DE 10 2013 102 599.4), Nov. 27, 2013 (5 pp.).
Schreiber et al., "High Brightness Fiber-Coupling Schemes for Diode Laser Bars", Proc. of SPIE, vol. 5876, Laser Beam Shaping VI, Jul. 31, 2005 (10 pp.).

\* cited by examiner

DEVICE FOR HOMOGENIZING A LASER BEAM

This is an application filed under 35 USC §371 of PCT/EP2014/054497 filed on Mar. 7, 2014 claiming priority to DE 10 2013 102 863.2 filed on Mar. 20, 2013.

BACKGROUND OF THE INVENTION

Definitions

In the propagation direction of the laser radiation means the average propagation direction of the laser radiation, particularly if the latter is not a plane wave or is at least partly divergent. Unless expressly indicated otherwise, laser beam, light beam, partial beam or beam does not mean an idealized ray from geometrical optics, but rather a real light beam, such as, for example, a laser beam having a Gaussian profile or a modified. Gaussian profile or a top-hat profile, which has an extended beam cross-section rather than an infinitesimally small beam cross-section.

Devices of the type mentioned in the introduction for homogenizing a laser beam are already known from the prior art in various embodiments. Imaging devices for homogenizing a laser beam are embodied in two stages and have a first homogenization stage and a second homogenization stage, which is arranged downstream of the first homogenization stage in the propagation direction. The first homogenizer stage comprises a first substrate having a light entrance surface and a light exit surface, wherein a first lens array having a plurality of cylindrical lens means is formed on the light entrance surface and/or on the light exit surface, at which cylindrical lens means the laser beam to be homogenized can be refracted and split into a plurality of partial beams. The second homogenizer stage comprises a second substrate having a light entrance surface and a light exit surface, wherein a second lens array having a plurality of cylindrical lens means is formed on the light entrance surface and/or on the light exit surface, which cylindrical lens means can again refract the partial beams transmitted through the second lens array. The laser beam has a substantially homogeneous angular distribution after emerging from the second homogenizer stage. Furthermore, the devices for homogenizing a laser beam that are known from the prior art comprise a Fourier lens arranged downstream of the second lens array in the beam propagation direction. The second lens array in combination with the Fourier lens is able to superimpose the partial beams in a working plane, which can be, in particular, an output-side focal plane of the Fourier lens, in such a way that a homogeneous (uniform) intensity distribution can be obtained there at least in one direction. The Fourier lens thus transforms the substantially homogeneous angular distribution of the laser radiation into a homogeneous intensity distribution in the working plane.

The cylindrical lens means of the first and second lens arrays can have different focal lengths. The pitches or vertex spacings $p1$, $p2$ of two adjacent cylindrical lens means in a lens array are identical for both lens arrays. It holds true that: $p1=p2$. The focal lengths of the cylindrical lens means of the two lens arrays and the distances between the lens arrays and between the Fourier lens and the second lens array are chosen such that a fixed line length or size of an illuminated field can be generated in the working plane at a specific distance from the second lens array.

DE 10 2007 026 730 A1 discloses a device for generating a homogeneous angular distribution comprising a total of three homogenization stages each having at least one lens array, wherein the distances between the homogenization stages are variably adjustable. A field lens (Fourier lens) can generate a homogeneous linear intensity distribution in the working plane from the homogeneous angular distribution. In this case, the angular distribution of the laser radiation can be set by displacement of the third homogenization stage. This displacement of the third homogenization stage can be used, as a result, to alter the length of the line in the working plane. The pitch of the lens means of the lens arrays is identical in all the lens arrays used.

In the case of the devices for homogenizing a laser beam that are known from the prior art, what proves to be disadvantageous is that an additional Fourier lens always has to be provided in order to obtain the desired homogeneous intensity distribution in the working plane.

BRIEF SUMMARY OF THE INVENTION

The present invention addresses the problem of specifying a device for homogenizing a laser beam which, without the provision of an additional Fourier lens, is able to generate a homogeneous intensity distribution in the working plane at least in one direction.

The solution to said problem yields a device, for homogenizing a laser beam of the type mentioned in the introduction comprising the features of the characterizing part of claim 1. The dependent claims relate to advantageous developments of the present invention.

A device for homogenizing laser radiation according to the invention is distinguished by the fact that the pitches $p1$ of the cylindrical lens means of the first lens array are greater than the pitches $p2$ of the cylindrical lens means of the second lens array, wherein a lens vertex of a central cylindrical lens means of the first lens array is aligned with a lens vertex of the central cylindrical lens means of the second lens array that is assigned thereto, and the lens vertices of the other cylindrical lens means of the first lens array and the lens vertices of the other cylindrical lens means of the second lens array and the lens vertices of the cylindrical lens means of the first lens array that are assigned thereto have an outwardly increasing vertex offset proceeding from the center of the second lens array, such that a homogeneous intensity distribution can be obtained in the working plane at least in the first direction. In this context, the term "assigned" means that each of the partial beams generated by the cylindrical lens means of the first lens array passes exactly through one of the cylindrical lens means of the second lens array (to be precise through the cylindrical lens means assigned to the partial beam and consequently to that cylindrical lens means of the first lens array which has generated said partial beam). According to the invention, it is provided that the pitches $p1$ of the cylindrical lens means of the first lens array differ from the pitches $p2$ of the cylindrical lens means of the second lens array, wherein $p1>p2$. The fact that the pitches $p1$, $p2$ between the lens vertices of the adjacent cylindrical lens means of the first lens array and of the second lens array are different in each case has the consequence that for the central (middle) cylindrical lens means of the two lens arrays the lens vertex of the central cylindrical lens means of the first lens array is aligned with the lens vertex of the central cylindrical lens means of the second lens array that is assigned thereto. For the lens vertices of the other cylindrical lens means (provided on both sides of the central lens means) of the two lens arrays, an outwardly increasing, lateral offset results. Proceeding from the central cylindrical lens means of the second lens array, the optical axis of which is aligned with the optical axis of the central cylindrical lens means of the first lens array that is assigned thereto, the cylindrical lens means of the second lens array, on account of the vertex offset, also have an outwardly increasing offset of their respective optical axes in relation to the optical axes of the cylindrical lens means of the first lens array that are assigned thereto. Consequently, the partial beams impinge with a lateral offset on the first optically functional interfaces of the cylindrical lens means of the second lens array that are assigned thereto. A major advantage of the device for homogenizing a laser beam according to the invention is that this device is embodied without a Fourier lens. It has surprisingly been found that, with the optical construction described here, a homogeneous intensity distribution can be obtained in the working plane at least in one direction, without an additional Fourier lens needing to be provided for this purpose.

In order to further increase the beam quality in the working plane, in one preferred embodiment it can be provided that the device comprises a cylindrical lens means whose cylinder axis is oriented perpendicular to the cylinder axes of the cylindrical lens means of the two lens arrays and which is embodied and arranged in the beam path downstream of the second lens array in such a way that it can focus the partial beams in the axis not homogenized after passage through the two lens arrays into the working plane.

In one particularly advantageous development of the invention it is proposed that the first substrate comprises on the second optically functional interface a plurality of cylindrical lens means which are arranged alongside one another in a second direction and form a third lens array, wherein the cylindrical lens means of the first substrate that are arranged alongside one another in the second direction have cylinder axes which are oriented parallel to one another and which are oriented orthogonally to the cylinder axes of the cylindrical lens means of the first lens array, the second substrate comprises on the second optically functional interface a plurality of cylindrical lens means which are arranged alongside one another in a second direction and form a fourth lens array, wherein the cylindrical lens means of the second substrate that are arranged alongside one another in the second direction have cylinder axes which are oriented parallel to one another and which are oriented orthogonally to the cylinder axes of the cylindrical lens means of the second lens array.

Alternatively, it can be provided that the device comprises a third substrate having a third lens array and also a fourth substrate having a fourth lens array, wherein the third lens array comprises a plurality of cylindrical lens means which are arranged alongside one another in the second direction and have cylinder axes which are oriented parallel to one another and which are oriented orthogonally to the cylinder axes of the cylindrical lens means of the first lens array, and wherein the fourth lens array comprises a plurality of cylindrical lens means which are arranged alongside one another in the second direction and have cylinder axes which are oriented parallel to one another and which are oriented orthogonally to the cylinder axes of the cylindrical lens means of the second lens array.

As a result, it is possible to obtain in the working plane a substantially rectangular intensity distribution illuminated, homogeneously in two mutually perpendicular directions.

In one particularly advantageous embodiment there is the possibility that the pitches p3 of the cylindrical lens means of the third lens array are greater than the pitches p4 of the cylindrical lens means of the fourth lens array. Analogously to the cylindrical lens means of the first and second lens arrays, here as well it is possible to obtain an offset of the lens vertices for the eccentric (non-central) cylindrical lens means.

In one particularly preferred embodiment it is proposed that the focal lengths $f_1$ of all the cylindrical lens means of the first lens array are identical and/or that the focal lengths $f_2$ of all the cylindrical lens means of the second lens array are identical.

In the case of a two-stage embodiment of the two lens arrays, in one advantageous embodiment it can be provided that the focal lengths $f_3$ of all the cylindrical lens means of the third lens array are identical and/or that the focal lengths $f_4$ of all the cylindrical lens means of the fourth lens array are identical.

In one particularly advantageous embodiment it is proposed that the device comprises means for varying the distance between the first lens array and the second lens array and/or that the device comprises means for varying the distance between the third lens array and the fourth lens array.

Preferably, said means can be designed for displacing the second lens array relative to the first lens array (which is accordingly preferably arranged in a stationary fashion in the beam path). Alternatively or additionally, said means can be designed for displacing the fourth lens array relative to the third lens array (which is accordingly preferably arranged in a stationary fashion in the beam path). By changing the distance between the first lens array and the second lens array and/or the distance between the third lens array and the fourth lens array, it is possible for the angular distribution of the homogenized laser radiation to be altered and adapted in a targeted manner. In this regard, for example, by displacing the second lens array, it is possible for the line length of the illuminated region of the working plane to be set continuously variably in a large range. It has surprisingly been found that, in a particularly advantageous manner, no appreciable power losses occur in this case.

In one particularly advantageous embodiment, the pitches p1, p2 of the cylindrical lens means of the first and second lens arrays can be chosen such that a height h2 of an outer marginal ray of an n-th, eccentric partial beam lies within the cylindrical lens means of the second lens array that is assigned thereto, wherein it holds true that h2<p1−(n+1)*(p1−p2).

In one particularly preferred embodiment it is proposed that for the ratio of the pitches p1/p2 of the cylindrical lens means of the first and second lens arrays it holds true that: 1<p1/p2≤1,1, preferably 1<p1/p2≤1.05, and/or that for the ratio of the pitches p3/p4 of the cylindrical lens means of the third and fourth lens arrays it holds true that: 1<p3/p4≤1.1, preferably 1<p3/p4≤1.05.

In order to obtain the desired homogeneous, linear intensity distribution in the working plane, the pitches p1, p2, the focal lengths $f_1$, $f_2$ and the distance d thereof and also the distance with respect to the working plane are chosen such that the cylindrical lens means of the second lens array that are situated further outward ("off-axis") illuminate a common field in the working plane from different angles. In the case of a linear displacement of the second lens array, the diameter of the partial beams impinging on the cylindrical lens means of the second lens array and thus also the aperture angles of the emerging partial beams change.

As mentioned above, the ratio of the pitches p1/p2 of the cylindrical lens means of the first and second lens arrays is preferably a few percent greater than 1 (for example 1.05). According to the sine law, the resulting beam offset p=n*(p1−p2) generates an angle β for a central principal ray in the n-th eccentric partial beam. It holds true that sin βL p/f$_2$. In this case, f$_2$ is the focal length of the cylindrical lens means of the second lens array. At a distance d' from the second lens array, the principal rays of all the partial beams are intended to meet, such that the following holds true: n*p1d'*tan β.

What is characteristic is that the outer marginal rays of each partial beam intersect shortly downstream of the second lens array in the beam propagation direction. If the distance d between the first lens array and the second lens array is altered by Δd and d'>>Δd, the principal rays of the partial beams still meet approximately at the same location. In this case, however, the aperture angle α of the partial beams changes, since the outer marginal rays impinge on the cylindrical lens means of the second lens array at different heights. In this regard, with d'=100 mm and Δd=12 mm it is possible to illuminate a line between 4 and 12 mm.

The aperture angle α of each partial beam is given by α=arcsin(p1/2*f$_h$). In this case, f$_h$ is the resulting, common focal length of the cylindrical lens means of the first and second lens arrays, for which it holds true that f$_h$=(f$_1$*f$_2$)/(f$_1$+f$_2$−d). The distance e between a common principal plane and the first, fixed lens array is given by e=d−(f$_2$*d)/(f$_1$+f$_2$−d). The line length l results from the aperture angle α by way of the relationship: l=2((tan(α)*(d+d'−e))−p1/2).

With the mathematical relationships mentioned above, the focal lengths f$_1$, f$_2$ of the cylindrical lens means on the first optically functional interfaces of the first and second lens arrays are linked to the line length l. In this case, it is assumed that the cylindrical lens means of the first lens array are fully illuminated. That means that the height of the marginal ray of each partial beam impinging on the cylindrical lens means of the first lens array corresponds to half the pitch p1/2. The cylindrical lens means of the second lens array are intended as far as possible not to be swamped. In one particular advantageous embodiment, the pitches p1, p2 of the cylindrical lens means of the first and second lens arrays can be chosen such that a height h2 of an outer marginal ray of an n-th, eccentric partial beam lies within the cylindrical lens means of the second lens array that is assigned thereto, wherein it holds true that: h2<p1−(n+1)*(p1−p2). What is advantageously achieved as a result is that the height of an outer marginal ray of the relevant partial beam lies within the second cylindrical lens means. Furthermore, the difference pitch p1, p2 can be linked to the number n of illuminated cylindrical lens means.

BRIEF DESCRIPTION OF THE DRAWINGS

Further features and advantages of the present invention will become clear from the following description of preferred exemplary embodiments with reference to the accompanying figures, in which.

DETAILED DESCRIPTION OF THE INVENTION

Figure 1:
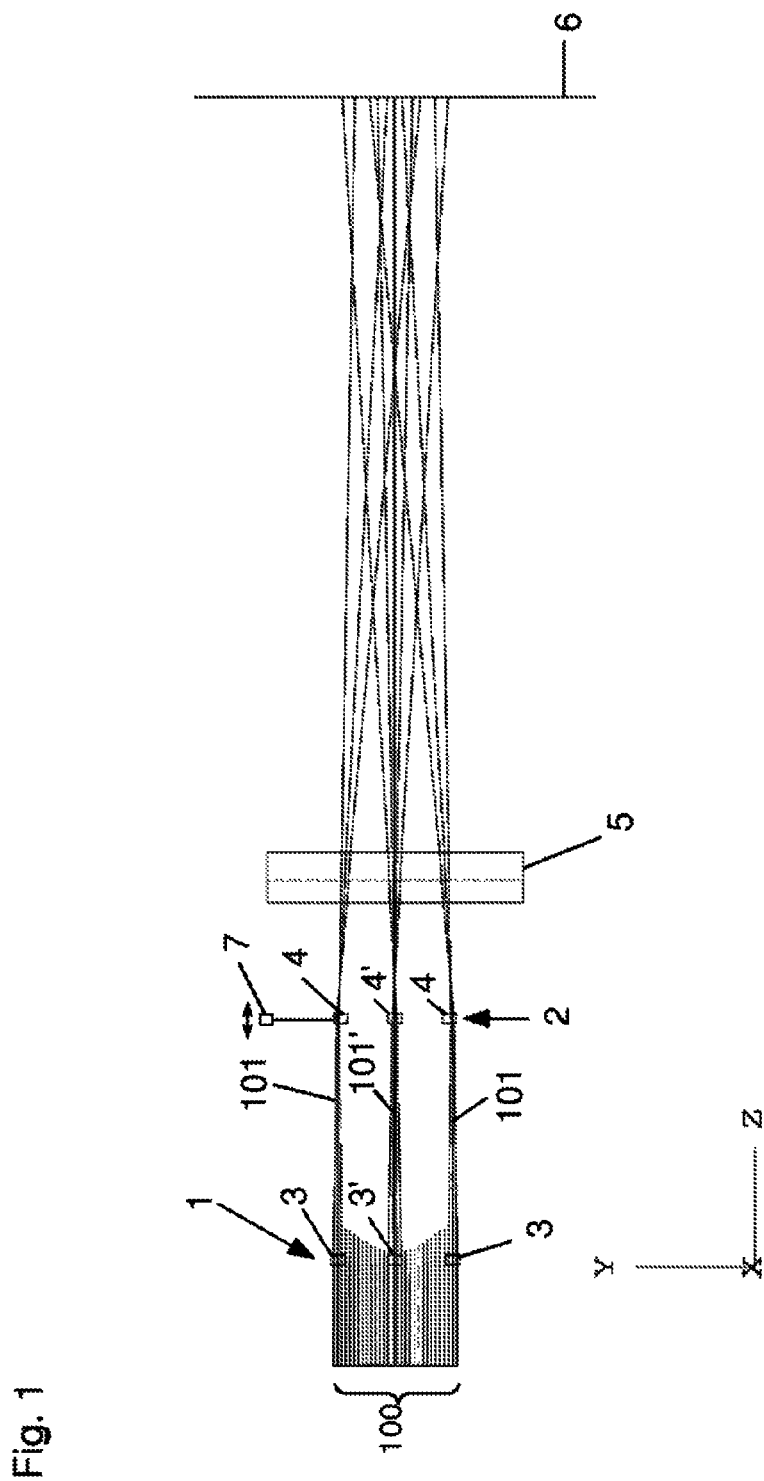
FIG. 1 shows a side view of a device for homogenizing a laser beam which is embodied in accordance with one preferred exemplary embodiment of the present invention.

A device for homogenizing, a laser beam 100 will be explained in greater detail below with reference to FIGS. 1 and 2, said device being embodied in accordance with one preferred exemplary embodiment of the present invention. In order to simplify the further explanations, a Cartesian coordinate system was depicted in FIG. 1 and FIG. 2, which system defines the y-direction and the z-direction orthogonal thereto, which is the propagation direction of the laser radiation 100 in the present case. The likewise indicated x-direction of the Cartesian coordinate system consequentially extends into the plane of the drawing.

The device for homogenizing a laser beam 100 is embodied in two stages and comprises a first substrate 1 having a first optically functional interface (light entrance surface), which has a plurality of cylindrical lens means 3 which are arranged alongside one another in the y-direction and the cylinder axes of which extend parallel to one another in the x-direction (and thus into the plane of the drawing), and having a second optically functional interface (light exit surface), which is embodied in a planar fashion in the present case.

The cylindrical lens means 3 form a first lens array. Adjacent cylindrical lens means 3 of the first lens array have a pitch or vertex spacing p1 that is identical for all pairs of adjacent cylindrical lens means 3. Furthermore, all cylindrical lens means 3 of the first lens array have identical focal lengths f$_1$ in this exemplary embodiment.

The device for homogenizing a laser beam 100 furthermore comprises a second substrate 2, which is arranged downstream of the first substrate 1 in the beam propagation direction (z-direction) and has a first optically functional interface (light entrance surface), which comprises a plurality of cylindrical lens means 4 arranged alongside one another in the y-direction and a second optically functional interface, which forms a light exit surface and is embodied in a planar fashion in the present case. The cylinder axes of the cylindrical lens means 4 of the second lens array 2 once again extend parallel to one another in the x-direction and thus into the plane of the drawing.

The cylindrical lens means 4 form a second lens array. Adjacent cylindrical lens means 4 of the second lens array have a pitch or vertex spacing p2 that is identical for all pairs of adjacent cylindrical lens means 4. Furthermore, all cylindrical lens means 4 of the second lens array have identical focal lengths f$_2$ in this exemplary embodiment.

In this exemplary embodiment, in the beam propagation direction downstream of the second substrate 2 there is arranged a cylindrical lens means 5 whose cylinder axis extends in the y-direction and thus orthogonally to the cylinder axes of the cylindrical lens means 3, 4 of the first and second lens arrays.

The laser radiation 100, which is emitted by as tat least one) laser light source (not explicitly illustrated here) and is collimated with the aid of at least one collimator means, firstly impinges on the first substrate 1. The collimated laser radiation 100, which can have an intensity profile in the form of a Gaussian profile, for example, enters the first lens array at the first optically functional interface (light entrance surface) and is split by the cylindrical lens means 3 formed there into a number of partial beams 101, 101' corresponding to the number of cylindrical lens means 3. In order that the illustration in the present case is not made complicated and is made clearer, FIG. 1 very deliberately depicts only three cylindrical lens means 3, 3' (a middle cylindrical lens means 3' and two outer cylindrical lens means 3) of the first lens array shown in FIG. 2 and also three cylindrical lens means 4, 4' (a middle cylindrical lens means 4' and two outer cylindrical lens means 4) of the second lens array that are assigned thereto, such that three partial beams 101, 10' are depicted in the beam propagation direction downstream of the first substrate 1. Nine partial beams 101, 101' are illustrated in the detail view in accordance with FIG. 2.

In the further beam path, the partial beams 101, 101' enter the second substrate 2 through the first optically functional interface (light entrance surface) and are refracted there another time by the cylindrical lens means 4, 4' of the second lens array before they emerge from the second substrate 2 from the second optically functional interface. With this construction, a homogeneous, linear intensity distribution can be obtained in a working plane 6, which is spaced apart from the second substrate 2, at least in a first direction (y-direction). For this purpose, the cylindrical lens means 5 arranged in the beam path downstream of the second substrate 2 is able to focus the non-homogenized axis of the partial beams 101, 101 into the working plane 6, which is the focal plane of the cylindrical lens means 5.

The device for homogenizing a laser beam 100 furthermore comprises means 7 for altering the distance between the first substrate 1 and the second substrate 2 or between the first lens array and the second lens array. In the present case, the means 7 are coupled to the second substrate 2 and can comprise an adjusting ring, for example. By changing the distance between the first lens array and the second lens array, it is possible for the angular distribution of the homogenized laser radiation to be altered and adapted in a targeted manner. By displacing the second lens array, it is possible for the line length of the illuminated region of the working plane 6 to be set continuously variably in a large range. It has surprisingly been found that no appreciable power losses occur in this case.

Figure 2:
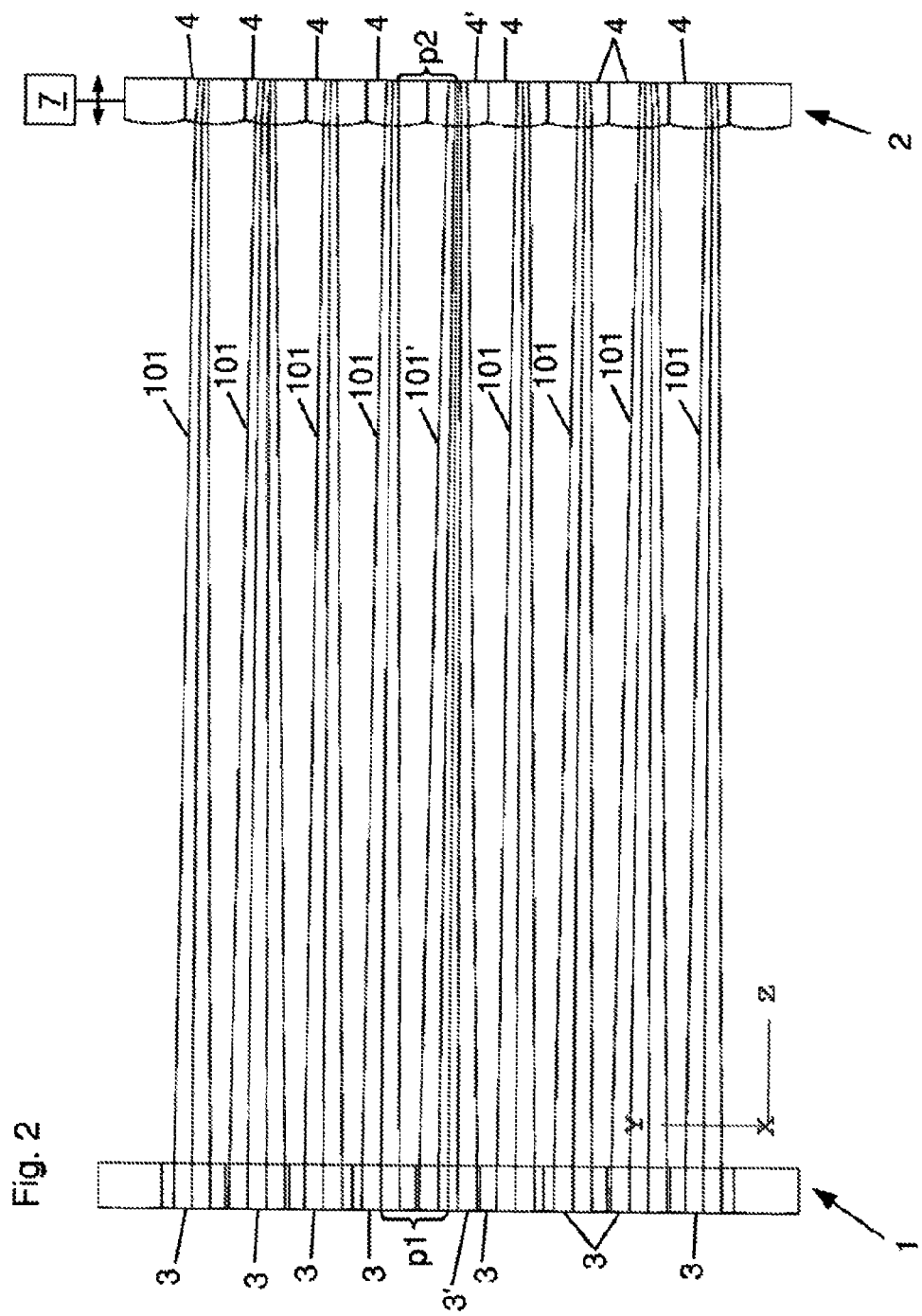
FIG. 2 shows a detail view of a first substrate and of a second substrate of the device for homogenizing a laser beam in accordance with FIG. 1.

As can be discerned in particular in FIG. 2, each cylindrical lens means 3 of the first lens array (and thus also each partial beam 101, 101' generated thereby) is assigned exactly one cylindrical lens means 4, 4' of the second lens array. In this context, the term "assigned" means that each of the partial beams 101, 101' generated by the cylindrical lens means 3, 3' of the first lens array passes exactly through one of the cylindrical lens means 4, 4' of the second lens array (to be precise through the cylindrical lens means 4, 4' assigned to the partial beam 101, 101' and, consequently, to that cylindrical lens means 3, 3' of the first lens array which has generated, said partial beam 101, 101').

The device for homogenizing a laser beam 100 thus comprises two lens arrays having a plurality of cylindrical lens means 3, 3', 4, 4'. Each cylindrical lens means 3, 3' of the first lens array thus shapes a partial beam 101, 101' from the collimated laser beam 100, which partial beam impinges on the assigned lens means 4, 4' of the second lens array and is refracted another time by the latter and is directed to the working plane.

As can be discerned in particular in FIG. 2, the pitches p1 of the cylindrical lens means 3, 3' of the first lens array differ from the pitches p2 of the cylindrical lens means 4, 4' of the second lens array, wherein p1>p2. The ratio of the pitches p1/p2 of the cylindrical lens means 3, 3', 4, 4' of the first and second lens arrays is preferably a few percent greater than 1 (for example 1.05). The fact that the pitches p1, p2 between the lens vertices of the first lens array and of the second lens array are different in each case has the consequence that only the lens vertices of the central cylindrical lens means 3', 4' of the two lens arrays are aligned with one another. For the lens vertices of the other cylindrical lens means 3, 4 of the lens arrays, an outwardly increasing lateral offset results. Proceeding from the central cylindrical lens means 4' in the center of the second lens array, the optical axis of which is aligned with the optical axis of the central cylindrical lens means 3' of the first lens array that is assigned thereto, the cylindrical lens means 4 of the second lens array, on account of the vertex offset, also have an outwardly increasing offset of their respective optical axes in relation to the optical axes of the cylindrical lens means 3 of the first lens array that are assigned thereto.

Figure 3:
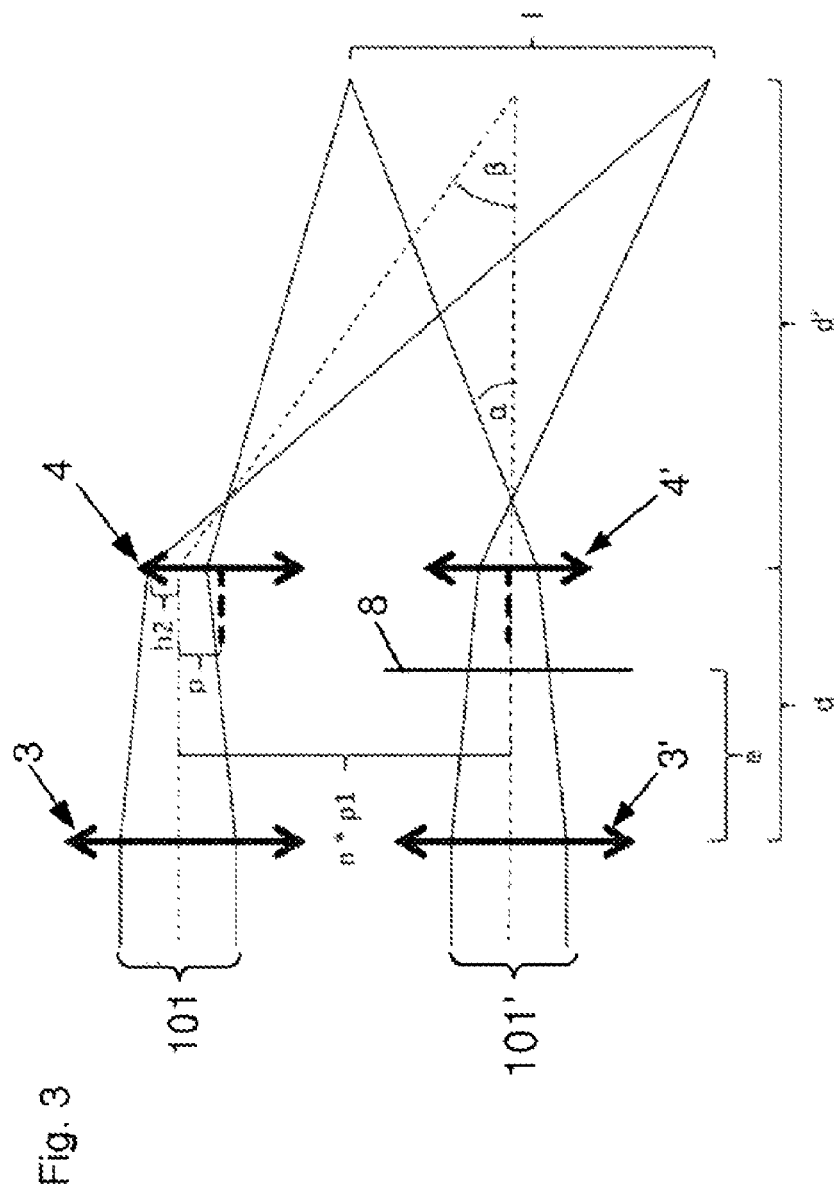
FIG. 3 shows a schematically greatly simplified basic illustration that is intended to elucidate individual beam geometries.

Some details of the beam geometries will be explained in greater detail below with reference to the basic illustration in accordance with FIG. 3.

In order to obtain the desired homogeneous, linear intensity distribution in the working plane 6, the pitches p1, p2 and focal lengths $f_1$, $f_2$ of the cylindrical lens means 3, 3', 4, 4', the distance d between the two lens arrays and also the distance d' between the second lens array and the working plane 6 are chosen such that the cylindrical lens means 4 of the second lens array that are situated further outward ("off-axis") illuminate a common field in the working plane 6 from different angles. When the second lens array is displaced, the diameter of the partial beams 101, 101' impinging on the cylindrical lens means 4 of the second lens array and thus also the aperture angles of the emerging partial beams 101, 101' change.

The ratio of the pitches p1/p2 of the cylindrical lens means 3, 3, 4, 4', of the lens arrays is preferably a few percent greater than 1 (for example 1.05). According to the sine law, the resulting beam offset p=n*(p1−p2) generates an angle β for a central principal ray in the n-th eccentric partial beam 101. It holds true that $\sin \beta = p/f_2$. In this case, $f_2$ is the focal length of the cylindrical lens means 4, 4' of the second lens array. At a distance d' from the second lens array, the principal rays of all the partial beams 101, 101' are intended to meet, such that the following holds true: n*p1=d'*tan β.

What is characteristic is that the outer marginal rays of each partial beam 101, 101' intersect shortly downstream of the second lens array in the beam propagation direction, if the distance d between the first lens array and the second lens array is altered by Δd and d'>>Δd, the central principal rays of the partial beams 101, 101' still meet approximately at the same location. In this case, however, the aperture angle α of the partial beams 101, 101' changes, since the outer marginal rays impinge on the cylindrical, lens means 4, 4' of the second lens array at different heights. In this regard, with d'=100 mm and Δd=12 mm it is possible to illuminate a line between 4 and 12 mm.

The aperture angle α of each partial beam 101, 101' is given by $\alpha = \arcsin(p1/2f_h)$. In this case, $f_h$ is the resulting, common focal length of the cylindrical lens means 3, 3', 4, 4', of the first and second lens arrays, for which it holds true that $f_h = (f_1 \cdot f_2)/(f_1 + f_2 - d)$. The distance e between a common principal plane 8 and the first, fixed lens array is given by $e = d \cdot (f_2 - d)/(f_1 + f_2 - d)$. The line length l results from the aperture angle α by way of the relationship: l=2 ((tan(α)(d+d'−e))−p1/2).

With the mathematical relationships mentioned above, the focal lengths $f_1$, $f_2$ of the cylindrical lens means 3, 3', 4, 4' of the first and second lens arrays are linked to the line length l. In this case, it is assumed that the cylindrical lens means 3, 3' of the first lens array are fully illuminated. That means that the height of the marginal ray of each partial beam 101, 101' impinging on the cylindrical lens means 3, 3' of the first lens array corresponds to half the pitch p1/2. The cylindrical lens means 4, 4' of the second lens array are intended not to be swamped. That means that the height of an outer marginal ray of the relevant partial beam 101, 101' is intended to lie within the cylindrical lens means 4, 4' assigned thereto in the manner explained above. It thus holds true that: h2<p1−(n+1)*(p1−p2). With this requirement, the difference in pitch between the cylindrical, lens means 3, 3', 4, 4' of the first lens array and of the second lens array can be linked to the number n of illuminated cylindrical lens means 3, 3', 4, 4'.

A description was given above of one exemplary embodiment of a device for homogenizing a laser beam 100 in which in each case only one of the two optically functional interfaces of the substrates 1, 2 has a plurality of cylindrical lens means 3, 3', 4, 4'.

In one advantageous development of the invention it is proposed that the first substrate 1 comprises on the second optically functional interface a plurality of cylindrical lens means which are arranged alongside one another in a second direction and have cylinder axes which are oriented parallel to one another and which are oriented orthogonally to the cylinder axes of the cylindrical lens means 3,3' on the first optically functional interface, wherein adjacent cylindrical lens means have a pitch p3, the second substrate 2 comprises on the second optically functional interface a plurality of cylindrical lens means which are arranged alongside one another in a second direction and have cylinder axes which are oriented parallel to one another and which are oriented orthogonally to the cylinder axes of the cylindrical lens means 4, 4' on the first optically functional interface, wherein adjacent cylindrical lens means have a pitch p4.

Alternatively, it can be provided that the device comprises a third substrate (not depicted) having a third lens array and also a fourth substrate (not depicted) having a fourth lens array, wherein the third lens array comprises a plurality of cylindrical lens means which are arranged alongside one another in the second direction and have cylinder axes which are oriented parallel to one another and which are oriented orthogonally to the cylinder axes of the cylindrical lens means 3, 3' of the first lens array, and wherein the fourth lens array comprises a plurality of cylindrical lens means which are arranged alongside one another in the second direction and have cylinder axes which are oriented parallel to one another and which are oriented orthogonally to the cylinder axes of the cylindrical lens means 4, 4' of the second lens array.

In this case, in particular, the third and fourth substrates can be arranged in the propagation direction Z downstream of the second substrate 2.

As a result, it is possible to obtain in the working plane (a substantially rectangular intensity distribution illuminated homogeneously in two mutually perpendicular directions. In one particularly advantageous embodiment there is the possibility that the pitches p3 of the cylindrical lens means of the third lens array are greater than the pitches p4 of the cylindrical lens means of the fourth lens array. Analogously to the cylindrical lens means 3, 3', 4, 4' of the first and second lens arrays, here as well it is possible to obtain an offset of the lens vertices for the eccentric cylindrical lens means.

The invention claimed is:

1. A device for homogenizing a laser beam (100), comprising:
    a first substrate (1) having a first optically functional interface, through which the laser radiation (100) can enter the first substrate (1), and having a second optically functional interface, through which the laser radiation (100) can emerge from the first substrate (1), wherein at least one of the two optically functional interfaces comprises a plurality of convex cylindrical lenses (3, 3') which are arranged alongside one another in a first direction and have cylinder axes oriented parallel to one another and in this way form a first lens array, wherein adjacent cylindrical lenses (3, 3') have a pitch (p1) and wherein the cylindrical lenses (3, 3') are embodied such that they can split the laser radiation (100) into a plurality of partial beams (101, 101'),
    a second substrate (2), which is arranged in the beam path downstream of the first substrate (1), having a first optically functional interface, through which the partial beams (101) can enter the second substrate (2), and having a second optically functional interface, through which the partial beams (101) can emerge from the second substrate (2), wherein at least one of the two optically functional interfaces comprises a plurality of convex cylindrical lenses (4, 4') which are arranged alongside one another in the first direction, have cylinder axes oriented parallel to one another and in this way form a second lens array, wherein the cylindrical lenses (4, 4') can refract the partial beams (101, 101') and direct them into a working plane (6), and wherein adjacent cylindrical lenses (4, 4') have a pitch (p2),
    wherein exactly one of the cylindrical lenses (4, 4') of the second lens array is assigned to each of the cylindrical lenses (3, 3') of the first lens array,
    wherein the pitches (p1) of the cylindrical lenses (3, 3') of the first lens array are greater than the pitches (p2) of the cylindrical lenses (4, 4') of the second lens array, wherein a lens vertex of a central one of the cylindrical lenses (3') of the first lens array is aligned with a lens vertex of a central one of the cylindrical lenses (4') of the second lens array that is assigned thereto, and the lens vertices of the other cylindrical lenses (4) of the second lens array and the lens vertices of the cylindrical lenses (3) of the first lens array that are assigned thereto have an outwardly increasing vertex offset proceeding from the center of the second lens array, such that a homogeneous intensity distribution can be obtained in the working plane (6) at least in the first direction, wherein for the ratio of the pitches p1/p2 of the cylindrical lenses (3, 3', 4, 4') of the first and second lens arrays it holds true that: 1<p1/p2≤1.1.

2. The device as claimed in claim 1, wherein the device comprises a cylindrical lens (5) whose cylinder axis is oriented perpendicular to the cylinder axes of the cylindrical lenses (3, 3', 4, 4') of the two lens arrays and which is embodied and arranged in the beam path downstream of the second lens array in such a way that it can focus the partial beams (101, 101') in the axis not homogenized after passage through the two lens arrays into the working plane (6).

3. The device as claimed in claim 1, wherein
    the first substrate (1) comprises on the second optically functional interface a plurality of cylindrical lenses which are arranged alongside one another in a second direction and form a third lens array, wherein the cylindrical lenses of the first substrate (1) that are arranged alongside one another in the second direction have cylinder axes which are oriented parallel to one another and which are oriented orthogonally to the cylinder axes of the cylindrical lenses (3, 3') of the first lens array, and in that
    the second substrate (2) comprises on the second optically functional interface a plurality of cylindrical lens means which are arranged alongside one another in a second direction and form a fourth lens array, wherein the cylindrical lenses of the second substrate that are arranged alongside one another in the second direction have cylinder axes which are oriented parallel to one another and which are oriented orthogonally to the cylinder axes of the cylindrical lenses (4, 4') of the second lens array.

4. The device as claimed in claim 1, wherein the device comprises a third substrate having a third lens array and also a fourth substrate having a fourth lens array, wherein the third lens array comprises a plurality of cylindrical lenses which are arranged alongside one another in the second direction and have cylinder axes which are oriented parallel to one another and which are oriented orthogonally to the cylinder axes of the cylindrical lenses (3, 3') of the first lens array, and wherein the fourth lens array comprises a plurality of cylindrical lenses which are arranged alongside one another in the second direction and have cylinder axes which are oriented parallel to one another and which are oriented orthogonally to the cylinder axes of the cylindrical lenses (4, 4') of the second lens array.

5. The device as claimed in claim 3, wherein the pitches (p3) of the cylindrical lenses of the third lens array are greater than the pitches (p4) of the cylindrical lenses of the fourth lens array.

6. The device as claimed in claim 1, wherein the focal lengths $f_1$ of all the cylindrical lenses (3, 3') of the first lens array are identical and/or in that the focal lengths $f_2$ of all the cylindrical lenses (4, 4') of the second lens array are identical.

7. The device as claimed in claim 1, wherein the device comprises means (7) for varying the distance between the first lens array and the second lens array.

8. The device as claimed in claim 7, wherein the means (7) are designed for displacing the second lens array relative to the first lens array and/or in that the means are designed for displacing the fourth lens array relative to the third lens array.

9. The device as claimed in claim 8, wherein the pitches (p1, p2) of the cylindrical lenses (3, 3', 4, 4') of the first and second lens arrays are chosen such that a height h2 of an outer marginal ray of an n-th, eccentric partial beam (101) lies within the cylindrical lenses (4) of the second lens array that is assigned thereto, wherein it holds true that: h2<p1−(n+1)*(p1−p2).

10. The device as claimed in claim 4, wherein for the ratio of the pitches p3/p4 of the cylindrical lens means of the third and fourth lens arrays it holds true that:

$1 < p3/p4 \leq 1.1$.

11. The device as claimed in claim 6, wherein the focal lengths $f_3$ of all the cylindrical lens of the third lens array are identical and/or in that the focal lengths $f_4$ of all the cylindrical lens of the fourth lens array are identical.

12. The device as claimed in claim 7, wherein the device comprises means (7) for varying the distance between the third lens array and the fourth lens array.

13. The device as claimed in claim 1, wherein for the ratio of the pitches p1/p2 of the cylindrical lenses (3, 3', 4, 4') of the first and second lens arrays it holds true that:

$1 < p1/p2 \leq 1.05$.

14. The device as claimed in claim 10, wherein for the ratio of the pitches p3/p4 of the cylindrical lens means of the third and fourth lens arrays it holds true that:

$1 < p3/p4 \leq 1.05$.

* * * * *